US008418726B2

(12) United States Patent
Baltes et al.

(10) Patent No.: US 8,418,726 B2
(45) Date of Patent: Apr. 16, 2013

(54) PRESSURE TANK, IN PARTICULAR HYDRAULIC ACCUMULATOR

(75) Inventors: Herbert Baltes, Losheim (DE); Markus Lehnert, Dillingen (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 385 days.

(21) Appl. No.: 12/448,674

(22) PCT Filed: Dec. 4, 2007

(86) PCT No.: PCT/EP2007/010500

§ 371 (c)(1), (2), (4) Date: Jun. 30, 2009

(87) PCT Pub. No.: WO2008/089812

PCT Pub. Date: Jul. 31, 2008

(65) Prior Publication Data

US 2010/0071792 A1 Mar. 25, 2010

(30) Foreign Application Priority Data

Jan. 25, 2007 (DE) ......................... 10 2007 003 724

(51) Int. Cl.
*F16L 55/04* (2006.01)

(52) U.S. Cl.
USPC ........................................................... 138/30

(58) Field of Classification Search ..................... 138/30
See application file for complete search history.

(56) References Cited

U.S. PATENT DOCUMENTS 2,343,320 A * 3/1944 Parker ............................ 138/30
2,360,590 A * 10/1944 Schweller ........................ 138/30
2,924,359 A * 2/1960 Beremand .................. 222/386.5
3,162,213 A * 12/1964 Peters ............................ 138/30
3,592,360 A * 7/1971 Aleck ............................ 222/95
3,727,642 A * 4/1973 Holmes ........................... 138/30
5,133,387 A 7/1992 Pietrykowski et al.
5,217,797 A 6/1993 Knox et al.
6,612,818 B2 * 9/2003 Nishio .......................... 417/472
6,901,965 B2 * 6/2005 Baltes et al. ..................... 138/30
6,948,479 B1 * 9/2005 Raney et al. .................. 123/456
2004/0065374 A1 * 4/2004 Baltes et al. .................... 138/30
2005/0263198 A1 * 12/2005 Kamada et al. ................. 138/30
2009/0101222 A1 * 4/2009 Baltes et al. .................... 138/30

FOREIGN PATENT DOCUMENTS

DE 23 61 261 A1 6/1975
DE 28 52 912 A1 6/1980
FR 1 605 326 8/1974
WO WO 98/55781 A1 12/1998
WO WO 98/55782 A1 12/1998
WO WO 02/075161 A1 9/2002

* cited by examiner

*Primary Examiner* — James Hook

(74) *Attorney, Agent, or Firm* — Roylance, Abrams, Berdo & Goodman L.L.P.

(57) ABSTRACT

A pressure tank, in particular hydraulic accumulator (3, 5), has a parting element (1) separating a space (11) for a first gaseous working medium from a space for a second fluid working medium in the tank. The parting element is flexible, can move under deformation and defines a domed main parting plane extending from an annular edge (13). The parting element (1) is produced from a substance having a fluoroplastic material, preferably a substance composed entirely of fluoroplastic material.

13 Claims, 2 Drawing Sheets

PRESSURE TANK, IN PARTICULAR HYDRAULIC ACCUMULATOR

FIELD OF THE INVENTION

The invention relates to pressure tank, in particular to a hydraulic accumulator, with a resilient separating element movable with deformation and separating a space in the tank for a first, in particular gaseous working medium, from a space for a second working medium, in particular a fluid. The separating element defines a domed main separating plane extending from an annular edge.

BACKGROUND OF THE INVENTION

A pressure tank of this type in the form of a hydraulic accumulator is disclosed in DE 28 52 912 A1. The resilient separating element is formed of a rubber-like material (synthetic rubber, such as acrylic nitrile-butadiene rubber) in the known hydraulic accumulator and forms a membrane movable by deformation and separating the gas side from the liquid side in the accumulator housing. Two main demands must be imposed on the operating behavior of hydraulic accumulators with these membranes movable by deformation. First, the impermeability of the membrane must be ensured to prevent gas diffusion. Second, corresponding mechanical properties of the membrane are necessary, especially ease of movement and high cyclic bending strength to be maintained even under the influence of corrosive media.

In the aforementioned known hydraulic accumulator, these requirements are only partially satisfied. To improve the impermeability of the rubber-like membrane in the known accumulator, annular bead-like elevations project out of the main separating plane in tight succession. Because the elevations increase the average wall density, diffusion tightness is in fact improved. However the significant increase of wall thickness leads to considerable stiffening and accordingly to a deterioration of mobility.

SUMMARY OF THE INVENTION

An object of the invention is to provide a pressure tank, in particular a hydraulic accumulator, having improved operating behavior.

According to the invention, this object is basically achieved by a pressure tank having a separating element produced from a substance having a fluoroplastic material or formed preferably entirely of fluoroplastic material. Outstanding diffusion tightness is ensured, while a separating element is provided having mechanical properties that are optimum for use as a membrane in hydraulic accumulators, such as extreme cyclic bending strength. Therefore, very small wall thicknesses can be used leading to the desired ease of movement of the membrane. Based on the resulting good response behavior, the pressure tank is therefore especially well-suited for use as a pulsation damper.

Polytetrafluoroethylene has been found to be an especially suitable material.

Polytetrafluoroethylene (PTFE) due to its very high melt viscosity cannot be plastically molded. The desired molded article from this material is cold pressed from powdered raw material with 200 to 400 bar and is sintered unpressurized at 370° to 380°. If films are to be obtained, they are generally peeled off solid cylindrical blocks. Polytetrafluoroethylene therefore is commercially available in general in the form of rigid solid bodies such as slabs, rods, tubes, etc. One with average skill in the art in the field of membrane technology would find it surprising to obtain separating elements produced in whole or in part from polytetrafluoroethylene material and having high mobility such that they can even assume the function of a flexible rolling membrane.

Since PTFE materials can moreover have especially good chemical resistance, the pressure tank according to the invention is also suitable for use in the presence of chemically corrosive media.

In advantageous embodiments, the separating element defines a domed main separating plane on whose side lying inside relative to the dome, annular bead-like elevations project. By using a membrane domed in this way in the pressure tank, a separating wall with a comparatively large area is available that is easy to deform and can effect a comparatively large change of volume of the bordering working spaces in the pressure tank.

In preferred embodiments, succeeding elevations are separated from one another by flat wall sections extending along the main separating plane. Between adjacent elevations, one free space at a time is available for relative movements of adjacent elevations so that without annular beads bordering one another, mutually supporting one another and stiffening the structure, the separating element can undergo deformation as a rolling membrane.

Preferably, the peaks of the annular bead-like elevations have a round dome so that notch effects are avoided.

In especially advantageous embodiments, the annular bead-like elevations are formed by folds open on the outer side and forming annular groove-like depressions in the main separating plane. According to the height of the folds in a membrane made in this way, similarly to a bellows, an especially great length of the movable material strip is available to roll up or pull out the membrane.

Preferably, the arrangement is made such that the height of at least one fold measured from the open end to the peak of the folds along its vertical axis is different relative to the height of other folds.

Especially good mechanical properties are obtained when the first fold nearest the annular edge has a smaller height than the other adjoining folds.

In this respect, it is also advantageous if the wall section extending from the annular edge to the nearest first fold has a wall thickness at the annular edge that has the largest value. The wall thickness then decreases toward the first fold to the value of the wall thickness of the wall sections between the folds. The edge thickening formed in this way, without adversely affecting the resilience of the remaining membrane, enhances the clamping of the membrane on the housing element of the pressure tank and the formation of a seal connection at the clamping site.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
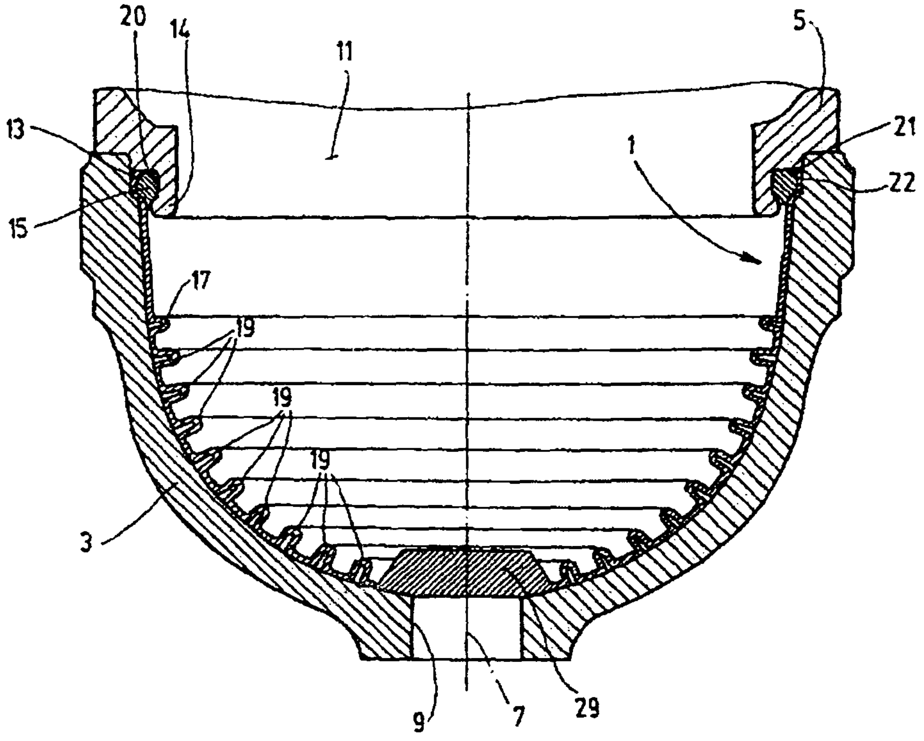
FIG. 1 is a partial side elevational view, schematically simplified, in section of a pressure tank according to one exemplary embodiment of the invention in the form of a hydraulic accumulator, with only the region of the bottom part of the housing and the bordering part of the top part of the housing being shown.

The exemplary embodiment of the pressure tank according to the invention is shown in the form of a hydraulic accumulator. FIG. 1 shows merely the bottom part 3 of the housing with a bottom-side fluid connection 9 concentric to the longitudinal axis 7 of the housing. A piece of the top part 5 of the housing borders the bottom part 3 of the housing. At the connection site between the bottom part 3 of the housing and the top part 5 of the housing the open, annular edge 13 of the separating element is clamped tight in the form of a rolling membrane 1. The thickened edge 21 of the rolling membrane 1 is supported on an annular surface 22 of the bottom part 3 of the housing and adjoins an O-ring 15 sitting in an annular groove 20 on an axially projecting annular body 14 of the top part 5 of the housing.

Figure 2:
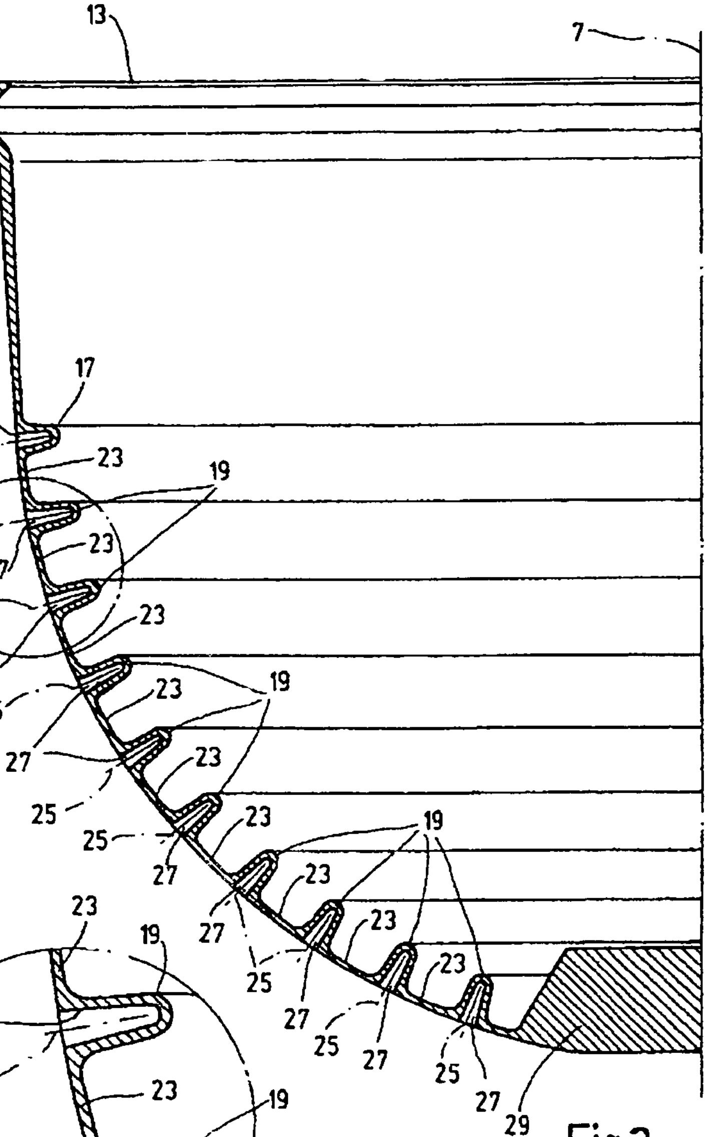
FIG. 2 is a partial side elevational view in section of only the separating element of the exemplary embodiment from FIG. 1, which element is made as a rolling membrane, and which section is shown as one half side and enlarged compared to FIG. 1.

FIGS. 1 and 2 show the roll membrane 1 in the completely unrolled or extended state, in which the space 11 located above the membrane 1 in FIG. 1, the gas side of the hydraulic accumulator, has the largest volume. No fluid pressure is at the fluid connection 9 allowing the membrane 1 to lie against the inside wall of the bottom part 3 of the housing. A central reinforcing bead 29 of the membrane 1 overlaps the edge of the fluid connection 9 to form a mechanical safeguard against the membrane 1 being pressed into the fluid connection 9 when fluid pressure is absent.

Figure 3:
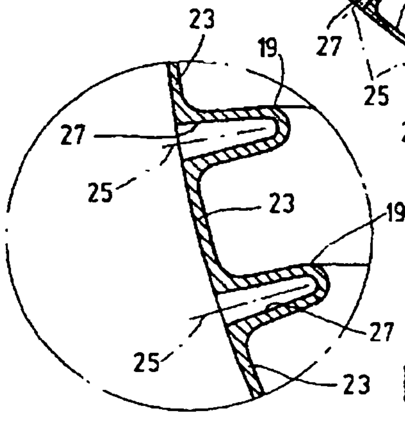
FIG. 3 is a partial side elevational view of the region identified with III in FIG. 2 which has been further enlarged compared to FIG. 2.

FIGS. 2 and 3 illustrate more details of the rolling membrane 1 produced from PTFE material. Due to the very good diffusion tightness of the PTFE material and especially good strength properties, the rolling membrane 1 merely needs a small wall thickness of the membrane as it emerges from the annular edge 13. This membrane 1 defines the domed main separating plane. Successive annular bead-like elevations project to the inside from this main separating plane and are formed in the illustrated example, not by beads in the form of solid bodies, but by folds including the first fold 17 nearest the edge 13 and adjoining folds 19. As is apparent from FIG. 1, proceeding from the thickened wall 21 on the annular edge 13, the membrane wall thickness changes such that the wall thickness decreases as far as the first fold 17 to the thickness value of flat wall sections 23 each located between the folds 17 and 19. In a practical embodiment, the wall thickness decreases from the thickening 21 to the first fold 17 from a value of 1.2 mm to a value of 0.5 mm of the succeeding wall section 23 between the folds 17 and 19. As FIG. 2 likewise shows, the thickened edge 21 on the inside forms a type of shell shape forming a partial enclosure of the O-ring 15 (not shown in FIG. 2).

As can likewise be recognized from FIG. 2, the fold height measured along the vertical axis 25 for the first fold 17 is smaller than for the succeeding folds 19. Each fold 19 has the same height. All folds 17 and 19 are domed at their peak. The folds 17 and 19 are open on the side that is the outer side relative to the dome. Annular groove-like depressions 27 (see in particular FIG. 3) are formed, with each forming interruptions in the course of the dome of the main separating plane between the wall sections 23. As can be recognized especially from FIG. 3, the inside width of the annular groove-like depressions 27 on the open end of the folds 17, 19 is much smaller than the fold height measured along the vertical axis 25. In this example, the height of the folds 19 is larger approximately by a factor of 4. The fold heights are less than the width of wall sections 23 between adjacent folds such that the folds do not border one another, support one another or stiffen the separating element.

As is likewise apparent from FIG. 3, the insides of the depressions 27 of the folds 17, 19 extend slightly diverging toward the open end so that the open end of the depressions 27 has a greater width than the base of the depressions 27 on the peak region of the folds. As FIG. 2 shows, the vertical axes 25 of the folds 19 each extend in roughly the vertical direction to the tangential plane relative to the adjacent wall sections 23. The vertical axis 25 of the first fold 17 extends slightly tilted to this tangential plane, with the vertical axis 25 of the first fold 17 enclosing an angle of approximately 10° with the plane of the annular edge 13. For the succeeding folds 19, the vertical axes 25 from fold to fold are tilted increasingly more steeply to the plane of the edge 13.

In this example, the annular bead-like elevations projecting on the inside of the membrane 1 are formed by folds 17 and 19, as a result of which especially easy mobility for rolling up the membrane results. Also, annular bead-shaped elevations can be made as solid bodies. Unfilled PTFE materials can be used, or those with a filler and/or filler combinations as can be provided conventionally for PTFE materials, for example, when extreme temperature resistance or other special properties are desirable. Glass fiber materials, carbon, or metallic fillers can be considered, among other materials.

Semifinished articles of PTFE materials are available in many forms, for example, films peeled off blocks, solid bars, round blanks, and the like. Based on the mechanical properties, finished products, such as the rolling membrane used in the pressure tank according to the invention, can be produced by cutting from molded bodies. These bodies are pressed and sintered from powdered raw material. In particular, for thin-walled articles, however, shaping by blow molding of a PTFE dispersion before sintering is possible. If the spherical membrane shape shown in FIG. 1 is obtained from a solid polytetrafluoroethylene body, it can then be brought into the illustrated shape of the separating membrane by cutting of the raw body. To minimize the polytetrafluoroethylene scrap forming in the cutting process, preferably a preform body as the blank can be produced in a half shell shape as a mold.

The polytetrafluoroethylene material as a fluoroplastic material can comprise both pure PTFE and modified PTFE, and can include both unfilled PTFE and PTFE compounds. For a modified PTFE material, fillers such as bronze, carbon dust, $MoS_2$, as well as glass fiber and carbon fiber materials are possible. In addition to PTFE, as other fluoroplastic materials the following can be used: ethylene tetrafluoroethylene (ETFE), ethylene chlorotrifluoroethylene copolymer (ECTFE), polychlorotrifluoroethylene copolymer (PCTFE), perfluoroalkoxy copolymer (PFA), polyvinylidene fluoride (PVDF) and tetrafluoroethylene perfluoropropylene (FEP).

While one embodiment has been chosen to illustrate the invention, it will be understood by those skilled in the art that various changes and modifications can be made therein without departing from the scope of the invention as defined in the appended claims.

What is claimed is:

1. A pressure tank, comprising:

a housing having a first space for receiving a first working medium and a second space for receiving a second working medium; and a resilient separating element being a rolling membrane and movable with deformation thereof, separating said first space and said second space in said housing and defining a generally hemispherically domed main separating surface extending from an annular edge to a bottom end, said separating element being formed of a substance having a fluoroplastic material; and annular bead shaped elevations on said separating element projecting inwardly from said domed main separating surface, said elevations being folds having open ends on an outer side of said domed main separating surface and forming annular groove-shaped depressions on said outer side of said domed main separating surface, said folds having vertical axes extending from said open ends thereof to peaks thereof, said vertical axes of adjacent ones of said folds being tilted at increasingly greater angles to a plane containing said annular edge from said annular edge to said bottom end.

2. A pressure tank according to claim 1 wherein said first space receives a gas; and said second space receives a liquid.

3. A pressure tank according to claim 1 wherein said housing and said separating element form a hydraulic accumulator.

4. A pressure tank according to claim 1 wherein adjacent ones of said elevations are separated from one another by flat wall sections extending along said domed main separating surface.

5. A pressure tank according to claim 4 wherein said flat wall sections have equal wall thicknesses.

6. A pressure tank according to claim 5 wherein a wall section extending from said annular edge to a first one of said elevations has a wall thickness with a largest value at said annular edge and with decreasing values toward said first one of said elevations to said equal wall thicknesses.

7. A pressure tank according to claim 4 wherein said heights of said elevations are less than widths of said flat wall sections between adjacent ones of said elevations.

8. A pressure tank according to claim 1 wherein said elevations have rounded domed peaks on inner ends thereof.

9. A pressure tank according to claim 1 wherein a first one of said folds has a height measured from said open end thereof to said a peak thereof along said vertical axis thereof different from heights of other ones of said folds from said open ends thereof to peaks thereof along vertical axes thereof.

10. A pressure tank according to claim 9 wherein said first one of said folds is nearest an annular edge of said separating element; and said height of said first one of said folds is smaller than said heights of said others of said folds.

11. A pressure tank according to claim 9 wherein said height of each of said folds is larger by at least a factor of two than a width of said depression thereof measured at said open end thereof.

12. A pressure tank according to claim 9 wherein said vertical axes of adjacent ones of said folds tilt at a small angle relative to one another.

13. A pressure tank according to claim 1 wherein said substance consists entirely of fluoroplastic material.

* * * * *